July 2, 1968   W. B. KRAUSKOPF   3,390,644
INSULATED CONTAINER
Original Filed Aug. 21, 1962   3 Sheets-Sheet 1
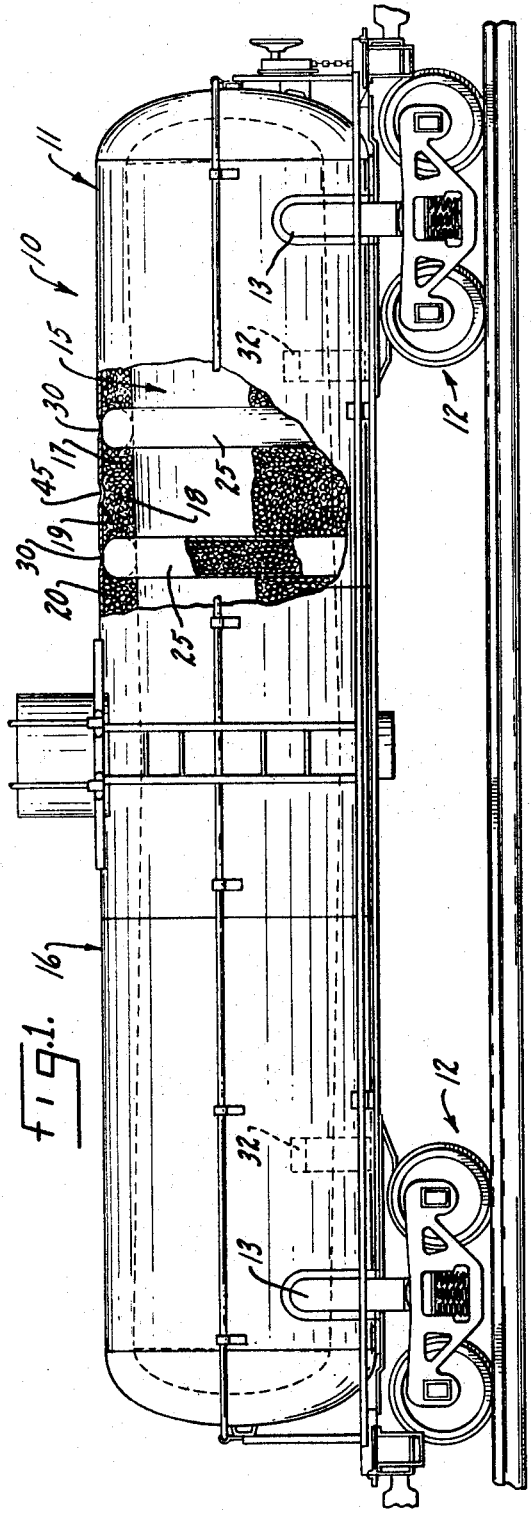
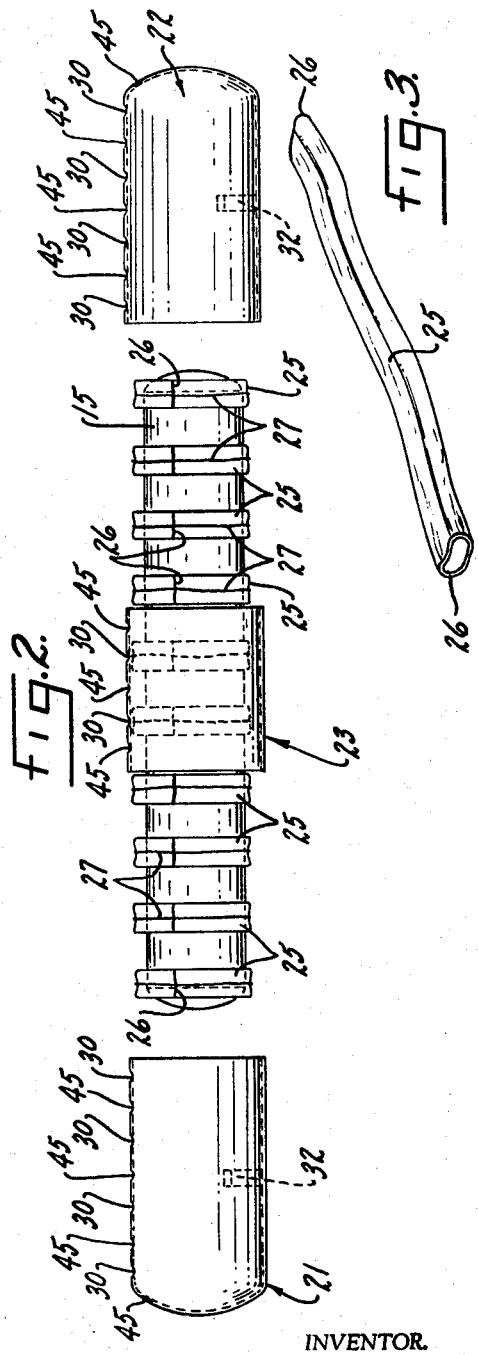
INVENTOR.
William B. Krauskopf,
BY
Attorneys.

July 2, 1968  W. B. KRAUSKOPF  3,390,644
INSULATED CONTAINER
Original Filed Aug. 21, 1962  3 Sheets-Sheet 2
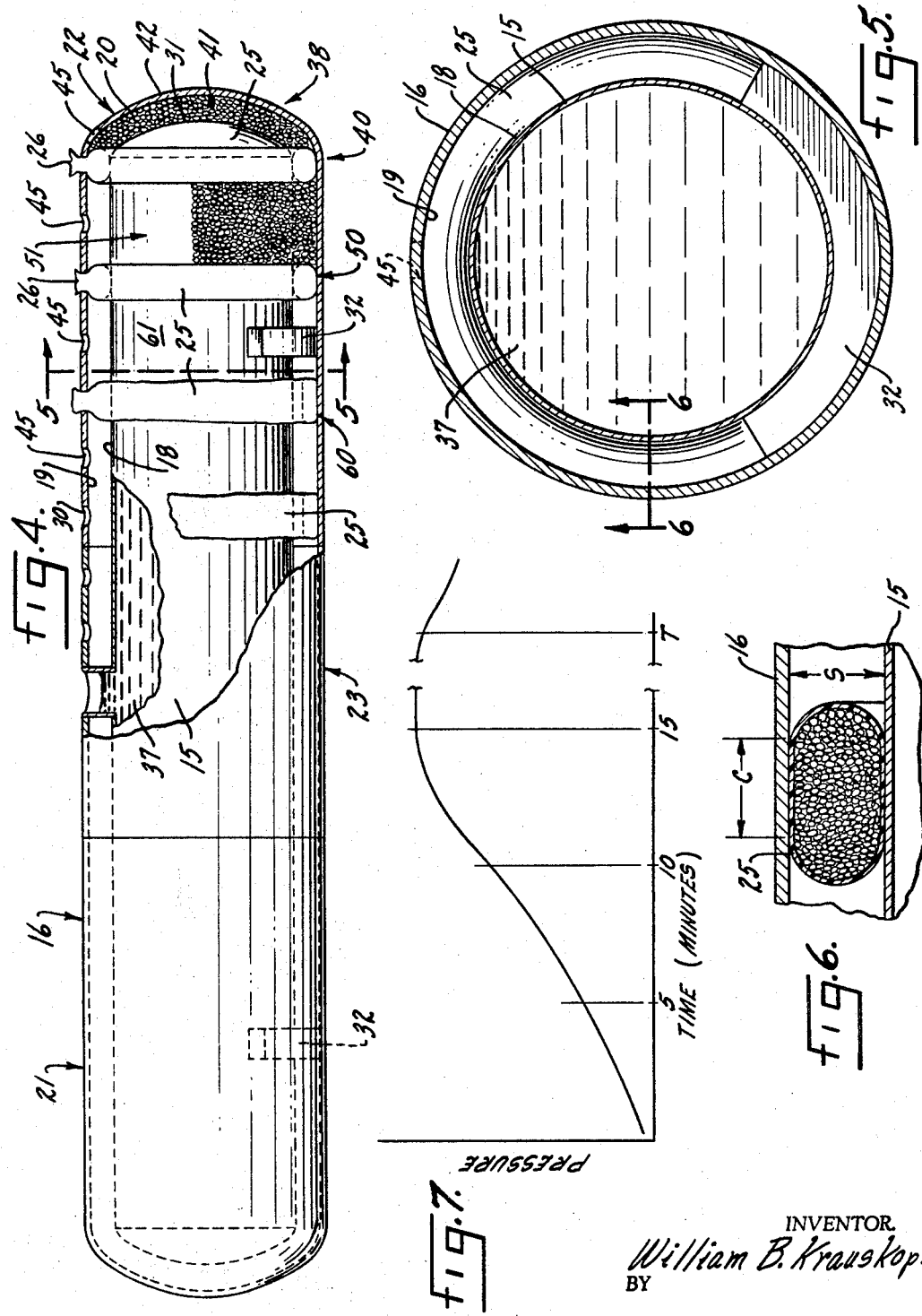
INVENTOR.
William B. Krauskopf,
BY
Attorneys.

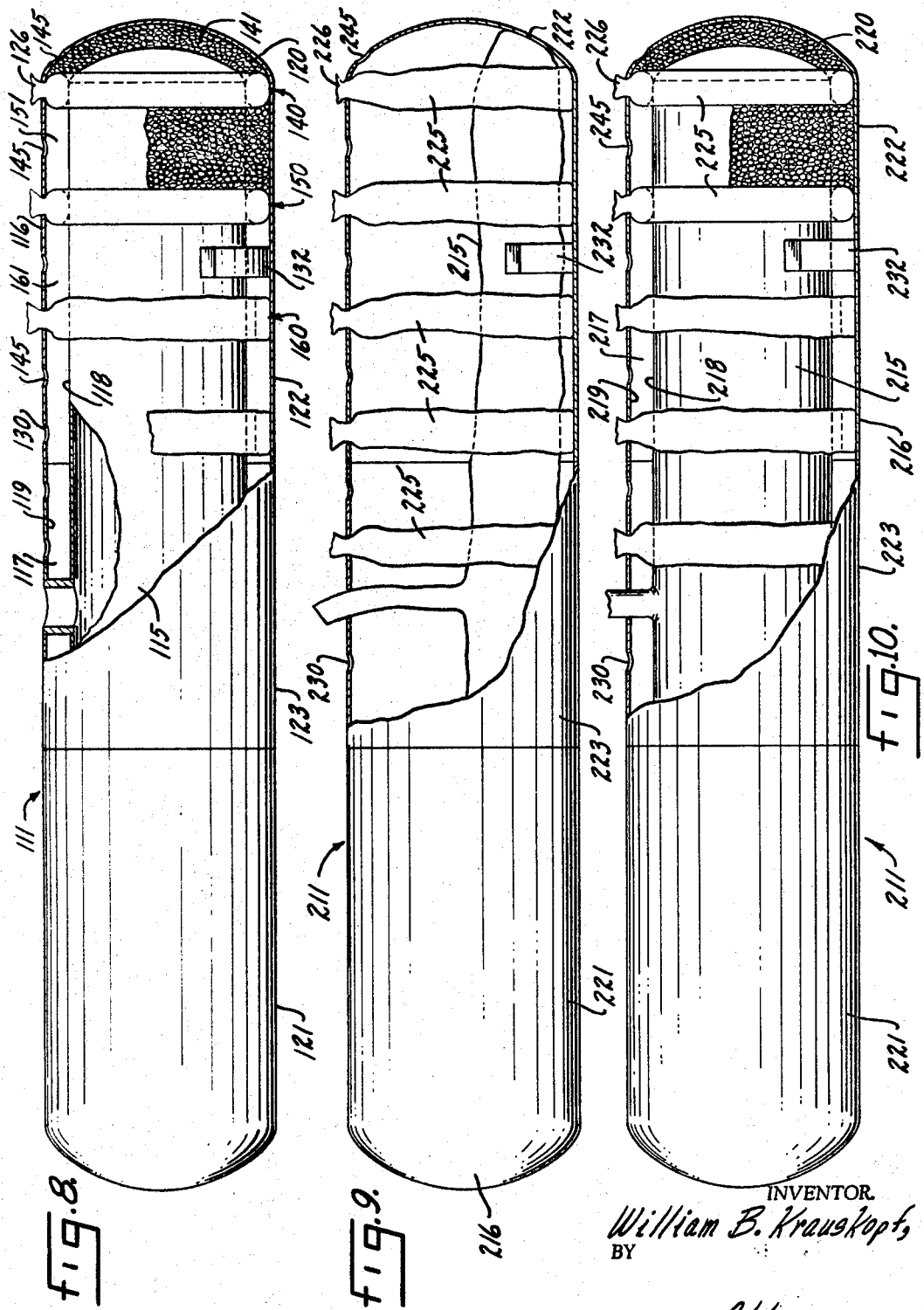

United States Patent Office 3,390,644
Patented July 2, 1968

3,390,644
INSULATED CONTAINER
William B. Krauskopf, Lombard, Ill., assignor to Union Tank Car Company, Chicago, Ill., a corporation of Illinois
Original application Aug. 21, 1962, Ser. No. 218,270, now Patent No. 3,313,020, dated Apr. 11, 1967. Divided and this application Oct. 4, 1965, Ser. No. 492,679
6 Claims. (Cl. 105—358)

ABSTRACT OF THE DISCLOSURE

An insulated tank comprising an inner container and an outer shell defining an annular space. The space, which is alternatively uniform in thickness along its length or widening along the base of the tank from its mid-point toward its outer ends, is filled with cellular insulating material foamed in place. The cellular insulating material may include sections bonded to both the inner container and the outer shell and other sections not bonded thereto.

---

This application is a division of application Ser. No. 218,270, filed Aug. 21, 1962, now Patent No. 3,313,020, issued Apr. 11, 1967.

This invention relates in general to containers and more particularly to an insulated container. It deals primarily with insulated container constructions.

It is an object to provide a double-wall insulated container wherein the walls are rigidly interconnected solely through the insulation to avoid direct heat transfer contact between the inner and outer walls.

It is another object to provide a double-wall insulated container which is stronger and more durable than generally similar containers presently utilized, and is readily adaptable for use in railway tank cars, for example, without supporting under structure.

It is still a further object to provide an insulated container of the aforedescribed character which is less expensive to fabricate than double-wall insulated containers of a broadly similar nature.

The above and other objects are realized in accord with the present invention by providing an improved insulated container. In general, the invention contemplates compartmentalizing the space between the inner and outer walls of a double-wall container to establish optimum size mold cavities which are sealed off from one another and introducing a foamed plastic producing material into the compartments. The material foams and hardens in the optimum size compartments into a cellular core of foamed plastic of uniform density and substantial strength.

One aspect of the present invention is embodied in the range of inner and outer wall constructions which are advantageously utilized. For example, the container might have a relatively flimsy inner wall and a structural outer wall. The flimsy inner wall can, as a matter of choice, be completely flexible. In the alternative, both the inner and the outer walls might readily be of relatively flimsy construction. Regardless of the structural makeup of the inner and outer walls, the core of foamed cellular plastic and the container walls bond together in sandwich relationship to form an insulated container having high structural integrity, superior strength, and excellent insulating characteristics.

Another aspect of the invention dwells in its advantageous application to railway tank cars and the like. The structural integrity and strength of certain of these containers is such that the understructure conventionally utilized in supporting a container of a tank car, for example, can readily be eliminated.

The invention, both as to its organization and method of operation, taken with further objects and advantages thereof, will best be understood by reference to the following description taken in connection with the accompanying drawings, in which:

FIGURE 1 is a side elevational view, partially in section, of a railway tank car incorporating an insulated container constructed in accordance with features of the present invention;

FIGURE 2 is a side elevational view of the container seen in FIGURE 1, in the initial stages of its construction;

FIGURE 3 is a perspective view of a semi-collapsed inflatable tube utilized in the present method;

FIGURE 4 is a side elevational view, partially in section, illustrating one form of insulated container at an intermediate stage in its construction;

FIGURE 5 is a sectional view taken along line 5—5 of FIGURE 4;

FIGURE 6 is a sectional view taken along line 6—6 of FIGURE 5;

FIGURE 7 is a graphic illustration of the relationship between elapsed time and expansion pressure exerted by the foaming plastic in accordance with the present invention;

FIGURE 8 is a side elevational view, partially in section, of another form of the insulated container at an intermediate stage in its construction;

FIGURE 9 is a side elevational view, partially in section, of yet another form of the insulated container at an intermediate stage in its construction; and FIGURE 10 is a side elevational view, partially in section, of the container illustrated in FIGURE 9 at a later intermediate stage in its construction.

Referring now to the drawings and particularly to FIGURE 1, a railway tank car embodying features of the present invention is illustrated generally at 10. The tank car 10 comprises an elongated insulated container 11 supported on its oppositely disposed ends by substantially identical wheel trucks 12 of generally conventional construction. Saddle-shaped bolsters 13 connected to the container 11, and to the trucks 12, firmly mount the container 11 on the trucks 12.

The insulated container 11 embodies features of one form of the present invention and as such, is specifically adapted to utilization in the railway tank car 10, for example. The structural integrity and strength of the insulated container 11 is so high as to obviate the necessity of using understructure extending between the railway trucks 12 in support of the container 11. It should be understood, however, that advantageous application of the container 11 is not limited to railway tank cars, or even to tank trucks or the like, and it might also be utilized in stationary structures where relatively sturdy construction is a necessity.

Another form of insulated container constructed in accordance with the present invention is illustrated generally at 111 in FIGURE 8, at an intermediate stage of its construction. In contrast to the insulated container 11, the insuated container 111 is somewhat simpler in construction and is slightly less sturdy. The method embodying features of the present invention facilitates fabrication of the insulated container 111 and the insulated container 111 is, as would be expected, somewhat less costly than the insulated container 11.

Yet another form of insulated container constructed in accordance with the present invention is ilustrated generally at 211 in FIGURES 9 and 10, at varying stages in its construction. The insulated container 211 is similar in construction to the insulated container 11, insofar as high structural integrity and strength is concerned. In this light, it might be utilized in storage tank installations where substantial strength is required; in a railway tank car, for example. The insulated container 111 is distinguished from the insulated container 111 in the characteristics of certain of its components.

Referring again to FIGURE 1 and specifically to the one form of insulated container 11, it will be seen to comprise an inner container 15 and an outer shell 16 defining an annular space 17 between the outermost surface 18 of the inner container 15 and the innermost surface 19 of the outer shell 16. This annular space 17 is filled with a uniform density core 20 of foamed cellular plastic having good insulation characteristics. The foamed cellular plastic is preferably a reaction product of organic polyisocyanate and a polyester or polyether. One example of such reactants is methyl glucoside polyether resin and polyisocyanate. It should be understood, however, that numerous other reactants might be utilized to obtain similar products.

According to the present invention the core 20 is molded in place in the annular space 17, which space 17 has been divided in fluid-tight relationship into optimum size mold cavities. The size of the cavities is determined by, first, the rate at which appropriate reactants can satisfactorily be introduced and, second, the "cream time" (time lapse before foaming begins) of the reactants. The space 17 is preferably divided so that the volume of each mold cavity is precisely that which can be charged, at maximum charging rate, with a required charge of the reactants, in a period of time equal to or less than the "cream time." As a result the primary advantages of molding in place are realized. The core 20 of foamed cellular plastic is formed in optimum sized portions, the foaming reactants being appropriately restrained during the formation of each portion of the core 20 to assure uniform core density and obviate the formation of gas pockets, for example.

Turning now to FIGURE 2 an initial stage in the manufacture of the insulated container 11 is illustrated. The inner container 15 is first fabricated from relatively thin corrosion resistant material such as stainless steel, glass lined steel, or plastic or the like. The inner container 15 is of a relatively flimsy construction and, as such, is somewhat inexpensive to fabricate. Somewhat inexpensive, that is, when it is realized that the corrosion resistant material necessarily utilized in its fabrication is ordinarily quite expensive. It is the features of the present invention which readily facilitate use of such a flimsy inner container 15.

The outer shell 16 of the insulated container 11 is, on the other hand, fabricated from relatively heavy gauge steel or aluminum or the like in two generally cylindrical single closed end sections 21 and 22, and a generally cylindrical open end center section 23. Once fabricated, these sections 21, 22, and 23, are heat treated to relative stresses developed during fabrication. The three sections 21, 22, and 23, are then ready to be slipped over the inner container 15 and welded together to form the outer shell 16. In this light, it should be understood that the use of three such sections is exemplary, and any plurality of sections might be utilized.

Precedent to assembling the outer shell 16 in enclosing relationship with the inner container 15, however, the inner container 15 is encircled in spaced relationship with a plurality of inflatable tubes 25 of polyethylene plastic or the like. Once the outer shell is assembled, the tubes 25 are adapted to be inflated to compartmentalize the annular space 17 between the inner container 15 and the outer shell 16. Each of the tubes 25 is normally cylindrical in cross-sectional configuration when inflated and is open at both ends 26, as seen in FIGURE 3, to facilitate introduction of an inflating medium.

To permit assembly of the outer shell 16 over the inner container 15 with the inflatable tubes 25 in place, the tubes 25 are initially tied in encircling relationship on the inner container 15 with wires 27 or the like. The open ends 26 of the tubes 25 are overlapped along the top of the inner container 15 so that they will be appropriately accessible to corresponding apertures 30 formed in spaced relationship along the top of the outer shell 16.

With the inflatable tubes 25 appropriately tied in encircling relationship on the inner container 15, the center section 23 of the outer shell 16 is slipped over the inner container 15 and positioned in the manner shown in FIGURE 2. Subsequently, the end sections 21 and 22 of the outer shell 16 are slipped over the oppositely disposed ends 31 of the inner container 15.

At this point, before the sections 21, 22, and 23, are brought together to be welded, spacer support blocks 32 of foamed cellular plastic or the like are seated within the oppositely disposed end sections 21 and 22, and positioned to support the inner container 15 within the outer shell 16. The blocks 32 are appropriately sized and shaped (see FIGURE 5) to seat the inner container 15 in prescribed spaced relationship within the outer shell 16 and define the annular space 17 having a predetermined cross-sectional configuration.

As illustrated in FIGURE 1, it is sometimes preferable to seat the inner container 15 in eccentric relationship with the outer shell 16 so that the inner container 15 can be constructed with a slight sag adjacent its mid-section (see FIGURE 1) to facilitate draining the inner container of its stored product. This relationship is not shown in succeeding views, being merely exemplary. Regardless of the cross-sectional configuration of the annular space 17, however, inflation of the tubes 25 causes them to adapt to this configuration and compartmentalize the space 17 in substantially fluid-tight relationship.

Welding the cylindrical sections 21, 22, and 23, together forms the outer shell 16, of course. Since it is fabricated from relatively heavy gauge steel or aluminum or the like, as has been pointed out, the outer shell 16 has a substantially high load bearing capacity. In this light, when the annular space 17 is uniformly filled with the core 20 of foamed cellular plastic the strength of the resulting insulated container 11 is substantially increased. The combination of the outer shell 16 and the core 20 of foamed cellular plastic, bonded to each other, is effective to obviate the necessity of utilizing outer superstructure with the tank car 10, for example.

At this point it should be pointed out that according to the present invention an alternative procedure for positioning the inflatable tubes 25 appropriately within the annular space 17 is to fish them around the inner container 15 with the wires 27, through the appropriately positioned apertures 30, after the outer shell 16 has been assembled and welded. This procedure is preferable where techniques utilized in welding the sections 21, 22, and 23, of the outer shell 16 are prone to damage pre-positioned tubes 25.

Once the outer shell 16 is assembled, with the tubes 25 in place, the unfinished container 11 is heated to a pre-selected optimum temperature to establish a controlled environment for the plastic foaming reaction which subsequently takes place in the annular space 17 between the inner container 15 and the outer shell 16. The pre-selected temperature is preferably in excess of any ambient temperature which might be encountered where the container 11 is assembled according to the present invention, and might be of the order of 120°, for example. The container 11, unfinished at this point, is preferably heated by the introduction of steam to the inner container 15, although any adaptable method of heating might be utilized.

A controlled environment is important because a prescribed amount of the aforementioned appropriate liquid reactants foam to a greater or lesser extent depending upon the temperature of the environment in which the foaming reaction takes place. Accordingly, if a known volume container (annular space 17) is to be properly filled with a prescribed charge of liquid plastic reactants, the environmental temperature must be relatively closely controlled. Furthermore, an environmental temperature somewhat higher than ambient temperature operates to assure greater uniformity in the density of the foamed cellular plastic throughout the core 20.

Referring now to FIGURE 4, after the unfinished container 11 has been heated to a predetermined optimum temperature, the inner container 15 is preferably filled with a relatively incompressible liquid 37, water for example, to balance the pressure subsequently exerted by the foaming plastic in the space 17 between the inner container 15 and the outer shell 16. An alternative expedient is to pressurize the inner container 15 with an appropriate gas. The use of an incompressible liquid is more desirable and substantially simpler, of course, but in some instances, as where an inflatable inner container is utilized, liquid is not compatible with the inflatable material because of its weight, and the container normally must be pressurized with a gas.

In the present instance, when the container 11 has been filled with water 37, for example, the tie wires encircling the inflatable tubes 25 are removed and the ends 26 of each tube are drawn out of a corresponding aperture 30 in the outer shell 16 of the container 11. In this relationship, the ends of the tube 25 are in position to be inflated. At this point the inflatable tube 25 nearest one end 38 of the container 11, as at 40, is preferably charged with a prescribed amount of the aforementioned liquid reactants. The ensuing foaming reaction inflates this tube 25.

Inflation of the tube 25, indicated at 40, seals off a compartment 41 defined by this tube 25, one end 31 of the inner container 15, and a corresponding end 42 of the outer shell 16. Since the inflatable tube 25 readily adapts itself to variations in the spacing between the inner container 15 and the outer shell 16, it moves into intimate contact with the outer surface 18 of the inner container 15 and the inner surface 19 of the outer shell 16 along its entire length, as best seen in FIGURES 5 and 6. To assure that a substantial portion of the inflatable tube 25 engages the surfaces 18 and 19 and solidly seats the plastic filled tube 25 in the annular space 17, the normal diameter of the tube 25 is empirically calculated to assure that the width C of those portions of the tube 25 engaging each of the surfaces 18 and 19 is substantially equal to or in excess of the maximum spacing S between the inner container 15 and the outer shell 16.

The foaming reaction of the aforementioned liquid reactants is such that the pressure exerted on the inner container 15 and on the outer shell 16 increases as the reaction continues, up to a predetermined point, after which it decreases slightly. As illustrated in the graph shown in FIGURE 7, the maximum pressure developed within the tube is reached after a minimum of approximately 15 min. of reaction time, in the present instance. This time varies, of course, with variation in formulation of the reactants utilized.

Although it is presently considered preferable to inflate the tubes 25 by foaming appropriate plastic forming reactants within the tubes, it should be pointed out that they might be inflated with gas under pressure, for example, of other fluids. In the former case, of course, the foamed plastic which is established is retained as part of the finished core 20, while in the latter case the tubes 25 are deflated after corresponding compartments (41 for example) are filled with foamed plastic.

At any rate, after the predetermined time lapse, a prescribed charge of foamable liquid plastic reactants is introduced, preferably to the compartment 41. Thus, maximum advantage is taken of the pressure exerted by the foam within the tube 25 to assure that the tube 25, indicated generally at 40, does not slip "downstream" in the annular space 17 under the increasing pressure of the foaming reaction within the compartment 41.

The liquid reactants are introduced to the compartment 41 through an aperture 45 in the outer shell 16 of the inner container 11. The aperture 45 is positioned adjacent the top of the outer shell 16 so that the liquid reactants descend into the compartment 41 under the influence of gravity. When a prescribed charge of the liquid reactants has been introduced into the compartment 41, the aperture 45 is sealed in any conventional manner, as by a sealing plate (not shown), for example.

In the alternative, it is sometimes preferable to avoid cutting the additional apertures 45 (additional to apertures 30) in the shell 16. In such case the reactants are introduced to the compartments through apertures 30 also. This might be accomplished by forcing a reactant feed pipe past a corresponding inflated tube 25, for example. For purposes of explanation, however, the separate apertures 45 are utilized.

The foaming reaction of the liquid reactants then takes place within the compartment 41, completely filling the compartment with foamed cellular plastic. The foamed cellular plastic rigidifies to form a portion of the core 20. Since the volume of the compartment 41 is relatively small, the foaming reaction which takes place within the compartment 41 is substantially uniform throughout the extent of the compartment 41 and consequently a core 20 of substantially uniform density is established from the top to the bottom of the container 11. Furthermore, the environmental temperature, 120° F. in this case, is sufficiently high to assure that substantially uniform density throughout the thickness of the core 20, from the outer surface 18 of the inner container 15 to the inner surface 19 of the outer shell 16, is maintained.

Regardless of the relatively high pressures built up within the compartment 41 by the foaming reaction of the liquid reactants, the inflated tube 25, indicated at 40, remains firmly seated in position within the space 17. As has been pointed out, firm seating of this plastic filled tube 25 is assured because of the substantial pressure developed within the tube 25, and because the diameter of each tube 25 is such that a substantial surface area of the tube engages both the outer surface 18 of the inner container 15 and the inner surface 19 of the outer shell 16. Consequently, that portion of the foamed cellular plastic core 20 formed within the compartment 41 is substantially uniform in density throughout.

The foaming reaction within the compartment 41 establishes an adhesive-type bond between the foamed cellular plastic core 20 and the outer surface 18 of the inner container 15, as well as with the inner surface 19 of the outer shell 16. This bond is effective to assure that the core 20 of foamed cellular plastic, the inner container 15, and the outer shell 16, form a substantially unitary structure of high strength and integrity.

When that portion of the foamed plastic core 20 within the compartment 41 has been established, a prescribed charge of liquid reactants is preferably introduced into the free ends of the next inflatable tube 25, indicated generally at 50. This tube 25 inflates under the influence of the foaming plastic in a manner substantially identical to that described in relation to the tube 25 indicated generally at 40. Inflation of this second tube 25, indicated generally at 50, to the extent illustrated in FIGURES 5 and 6, seals off the next adjacent compartment 51 in substantially fluid-tight relationship from the remainder of the space 17 between the inner container 15 and the outer shell 16. After the prescribed period of time has elapsed, during which period maximum foaming pressure is developed in the tube 50 (see FIGURE 7), a prescribed charge of liquid reactants is introduced through a corresponding aperture 45 into the compartment 51. Subsequently, the aforedescribed foaming reaction takes place, completely filling the compartment 51 with foamed cellular plastic of substantially uniform density throughout.

When the foaming reaction within the compartment 51 has taken place, the foregoing sequence of operations is repeated with regard to the inflatable tube 25 indicated generally at 60, and the corresponding compartment 61 which it defines in cooperation with the inner container 15, the outer shell 16 and the inflated tube 25 (seen at 50) hereinbefore referred to. The foaming reaction within the compartment 61 completely envelops the corresponding spacer support block 32, preferably composed of a block of foamed cellular plastic identical to that formed in the aforedescribed foaming reaction, to establish another substantially uniform portion of the foamed plastic core 20 within the compartment 61.

The foregoing sequence of operations in which a tube 25 is first filled with a prescribed charge of liquid plastic reactants and the thus defined compartments (41, 51, 61, etc.) are subsequently filled with a prescribed charge of liquid plastic reactants, is repeated along the length of the container 11. Since the volume of each compartment is precisely that which will be filled by the maximum charge which can be introduced in the "cream time" of the reactant formula, the compartments fill instantly and uniformly. There is no leakage into as yet empty compartments since the inflated tubes 25 establish virtually fluid-tight seals with the inner container 15 and the outer shell 16. Consequently, the entire core 20 of foamed cellular plastic is substantially uniform in density and fills the entire annular space 17, leaving no voids.

In contrast to the aforedescribed sequence for filling compartments 41, 51, etc., with foamed plastic, they might also be filled at random, of course, as long as opposite ends of the compartment are sealed off with corresponding inflated tubes 25. The sequence described is, however, generally the most easily followed.

The double-wall container 11 is virtually a unitary structural member when the complete core 20 is formed. As such, it is extremely strong and readily adapted to utilization in a railway tank car of the type illustrated in FIGURE 1. Due to the strong bond established between the core 20, the inner container 15, and the outer shell 16, movements of a stored liquid within the container 11, as when the tank car 10 is braked, for example, do not cause relative movement of these components with corresponding untoward effects. Nevertheless, the inner container 15 is of relatively flimsy construction, requiring a minimum amount of the expensive corrosion resistant materials normally required in such an application. In addition, the inner container 15 is supported only by the plastic core 20. Consequently undesirable heat transfer through the metal supports normally required is avoided.

Turning now to FIGURE 8, the double-wall container 111 embodying features of another form of the present invention is illustrated at an intermediate stage in its construction. The insulated container 111 is distinguished from the aforedescribed insulated container 11 only in that both its inner and outer walls are fabricated from relatively flimsy material. Since the makeup and the method of construction of the two containers 11 and 111 is otherwise identical, a detailed description thereof is not thought to be necessary. Corresponding features of the insulated container 111 are identified by corresponding reference numerals plus 100 digits.

The container 111 is even less expensive to construct than the container 11, as will readily be recognized, though it is sturdy in construction due to its sandwich type construction. Furthermore, like the container 11, its inner container 115 is supported within its outer shell 116 solely by a core 120 of foamed cellular plastic and not by metal supports, for example, which transmit heat readily and reduce the insulating efficiency of the container.

Referring now to FIGURES 9 and 10, an insulated container 211 defining features of yet another form of the present invention is illustrated at intermediate stages in its construction. The insulated container 211 is distinguished from the insulated container 11 hereinbefore discussed only in that its inner wall is comprised of a flexible material which readily bonds to foamed plastic. Various plastics and rubbers might be utilized.

More precisely, the container 211 includes an inner container 215 comprising an inflatable bag of rubber, for example. The structural outer shell 216 is assembled in enclosing relationship with the bag 215 while the bag 215 is deflated, as seen in FIGURE 9. The bag 215 is subsequently inflated with an appropriate gas to a semi-rigid state, as seen in FIGURE 10. At this stage, the bag 215 is virtually identical in construction to the flimsy fabricated inner container 15 associated with the insulated container 11, resting on spacer support blocks 232, and encircled by inflatable tubes 225.

In all other aspects the container 211 and its method of construction are substantially identical to that described in relation to the insulated container 11. Consequently, corresponding features of the insulated container 211 are identified by identical reference numerals plus 200 digits. A further detailed description of the insulated container 211 construction is not thought to be necessary.

The insulated container 211 combines all the attributes of the insulated container 11 plus additional features. For example, the inner bag 215 is prefabricated and requires no sophisticated assembly techniques, of course. It is readily transported, for example, to the point of container assembly, yet when the container 211 is completed it provides a structure virtually as sturdy as the aforedescribed insulated container 11 and of comparable structural integrity.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A railway tank car, comprising: an elongated horizontal tank supported at its opposite ends without intermediate superstructure by truck assemblies, said tank providing substantially all of its own rigidifying support between said truck assemblies, said tank including a generally cylindrical outer shell, a generally cylindrical inner container positioned within said outer shell so as to define an annular space between said container and said shell, at least a portion of said inner container diverging from the adjacent shell in a direction from the tank center towards its outer ends, and a substantially continuous rigid structural core of cellular insulating material in said space, said core where it is complementary to said portion of said inner container increasing in thickness for said tank center towards its outer ends.

2. A tank for a railway tank car or the like comprising: an outer shell, an inner container positioned within said outer shell and defining a space between said container and said shell, and a substantially continuous rigid structural core of cellular insulating material in said space, said core including first predetermined sections bonded to the inside of said outer shell and to the outside of said inner container and second predetermined sections not bonded to the inside of said outer shell or to the outside of said inner container, said second predetermined sections comprising means confining some of said cellular insulating material therewithin so as to prevent bonding of such confined cellular insulating material to the inside of said outer shell or the outside of said inner container.

3. The tank of claim 2 further characterized in that said second predetermined sections are substantially regularly spaced along the length of the tank whereby they separate said annular space into a plurality of first predetermined sections.

4. A railway tank car or the like, comprising truck assemblies, tank supporting structure supported by said assemblies, a tank supported by said supporting structures, said tank including a generally cylindrical outer shell formed of relatively heavy structural material, a generally cylindrical inner container formed of relatively flimsy material compared to the material of said outer shell and positioned within said outer shell so as to define an annular space between said container and said shell, and a substantially continuous rigid structural core of cellular insulating material in said space, said core having substantially constant density throughout and including first predetermined sections bonded to the inside of said outer shell and to the outside of said inner container and second predetermined sections not bonded to the inside of said outer shell or to the outside of said inner container.

5. A tank for a railway tank car or the like, comprising: a generally cylindrical outer shell, a generally cylindrical inner container positioned within said outer shell and defining an annular space between said container and said shell, and a rigid structural core of cellular insulating material of substantially constant density disposed in said space to insulate said container and shell from one another, said core including a plurality of alternate core sections and endless barrier means disposed between said container and shell, said core sections being separately by said endless barrier means and being comprised solely of said cellular insulating material bonded to both said container and said shell, and said endless barrier means including endless inflatable tube means filled with said cellular insulating material, said tube means being unbonded from said container and said shell.

6. A tank for a railway tank car or the like, comprising: a generally cylindrical outer shell, a generally cylindrical inner container positioned within said outer shell so as to define an annular space between said container and said shell, at least a portion of said inner container diverging from the adjacent shell in a direction from the tank center towards its outer ends, and a substantially continuous rigid structural core of cellular insulating material in said space, said core where it is complementary to said portion of said inner container increasing in thickness from said tank center toward its outer ends, said core including first predetermined sections bonded to the inside of said outer shell and to the outside of said inner container, and second predetermined sections not bonded to the inside of said outer shell or the outside of said inner container.

References Cited
UNITED STATES PATENTS

| | | | |
|---|---|---|---|
| 2,011,076 | 8/1935 | Prescott | 105—360 X |
| 2,907,284 | 10/1959 | Folmsbee | 105—360 |
| 3,158,383 | 11/1964 | Anderson et al. | 105—360 X |

FOREIGN PATENTS 1,072,218  12/1959  Germany.

DRAYTON E. HOFFMAN, *Primary Examiner.*

UNITED STATES PATENT OFFICE
CERTIFICATE OF CORRECTION

Patent No. 3,390,644                      July 2, 1968

William B. Krauskopf

It is certified that error appears in the above identified patent and that said Letters Patent are hereby corrected as shown below:

Column 2, line 59, "insuated" should read -- insulated --. line 66, "ilustrated" should read -- illustrated --. Column 8 line 47, "thickness for" should read -- thickness from --. Column 9, line 19, "separately" should read -- separated --.

Signed and sealed this 16th day of December 1969.

(SEAL)
Attest:

Edward M. Fletcher, Jr.                      WILLIAM E. SCHUYLER, JR.
Attesting Officer                              Commissioner of Patents